(12) United States Patent
Chang

(10) Patent No.: US 6,286,025 B1
(45) Date of Patent: Sep. 4, 2001

(54) METHOD AND SYSTEM OF PROCESS IDENTIFICATION BY USER DEFINED PROCESS VARIABLES

(75) Inventor: David Yu Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/352,662

(22) Filed: Dec. 9, 1994

(51) Int. Cl.$^7$ .................................................. G06F 9/00
(52) U.S. Cl. ............................................... 709/100
(58) Field of Search .......................... 395/650, 704, 395/680–683; 709/100

(56) References Cited

U.S. PATENT DOCUMENTS

| | | | |
|---|---|---|---|
| 5,247,693 | * | 9/1993 | Bristol ................................ 395/705 |
| 5,319,645 | * | 6/1994 | Bassi et al. ........................... 371/19 |
| 5,475,851 | * | 12/1995 | Kodosky et al. ..................... 395/800 |

OTHER PUBLICATIONS

Stevens, W., Richard, "Advanced Programming in the UNIX Environment", Addison–Wesley, pp. 85–90, 130, 172, 173, 188, 189, 190, 192, 210, 238–240, 1992.*
(no author) "Borland Turbo Debugger Ver. 2.5 User's Guide", Borland International, Inc. pp. 106–117, 1991.*

* cited by examiner

Primary Examiner—St. John Courtenay, III
(74) Attorney, Agent, or Firm—Casimer K. Salys; Bracewell & Patterson, L.L.P.

(57) ABSTRACT

A method and system is provided for attaching user defined information to a process object in a data processing system. The method comprises creating a process control block corresponding to an invoked process. The control block has system defined process variables that are assigned values by the operating system. The method further comprises defining a user defined process variable in the process control block, and assigning a value to the user defined process variable.

26 Claims, 7 Drawing Sheets

| 161 | 162 | 163 | 164 | 165 | 166 | 167 | 168 | 169 |
|---|---|---|---|---|---|---|---|---|
| UID | PID | PPID | | | STIME | TTY | TIME | COMMAND |
| smith | 1941 | 1 | | | 17:02:37 | console | 0:01 | sh |

| 161 | 162 | 163 | 164 | 165 | 166 | 167 | 168 | 169 |
|---|---|---|---|---|---|---|---|---|
| UID | PID | PPID | PROC_NAME | GROUP_NAME | STIME | TTY | TIME | COMMAND |
| smith | 1941 | 1 | shell-1 | sys | 17:02:37 | console | 0:01 | sh |

| 161 | 162 | 163 | 170 | 171 | 166 | 167 | 168 | 169 |
|---|---|---|---|---|---|---|---|---|
| UID | PID | PPID | READY | GROUP_NAME | STIME | TTY | TIME | COMMAND |
| smith | 2203 | 1941 | False | dbm | 17:06:37 | console | 0:21 | syncproc |

METHOD AND SYSTEM OF PROCESS IDENTIFICATION BY USER DEFINED PROCESS VARIABLES

BACKGROUND OF THE INVENTION

1. Technical Field

The present invention relates generally to digital computer systems and in particular to methods and systems for managing processes in a digital computer system through user defined indicia.

2. Description of the Related Art

In multiprocessing operating systems such as OS/2® and UNIX®, processes are the execution entities in the operating system environment. The operating system has a variety of service functions that are very important to the performance, usability, and manageability of these processes. Some examples of operating system process service functions are the process monitor, which monitors the status of processes executing on the system, and can generate a display on the user's monitor showing the status of current processes, process synchronization, which synchronizes the execution of processes, and process communication, which passes information between processes. Although such operating system process service functions are basic to the operation of a computer system, the implementation of these process service functions is often complicated and expensive in terms of processor overhead.

The process monitor service function displays the status of a process. The process status display includes the process ID, which is assigned to the process by the operating system when the process is invoked, and a program name. Without the program name, the users cannot recognize the function of the process. When multiple processes are spawned by the same program, each spawned process will have the same program name. Thus, program names cannot be used to uniquely identity a process, particularly when multiple processes are created with the same program. In addition, each process has a unique process ID that is created at run time, dynamically. From the manageability point of view, process IDs are difficult to use because the ID number that will be assigned to a process cannot be predicted beforehand. Therefore, there is needed a method to identify individual processes when using the process monitor service function.

Process management service functions allow a user or process to manage and control the processes being executed on the user's computer. In UNIX®, processes can be grouped by user IDs or group IDs only. In OS/2®, there are no mechanisms to group processes for process management. It would be beneficial to provide a method and system of grouping processes from the application point of view, in order to facilitate process management.

Process synchronization is a process service function that allows the execution of multiple processes to be synchronized There are many process synchronization mechanisms that are provided in modern operating systems: examples are Semaphores, and Locks. However, for simple applications, these mechanisms are too expensive and too difficult to use. What is needed is a simple method of synchronizing processes that has very little overhead.

Process communication is a process service function that enables information to be passed between processes. Message queues and shared memory are the most popular ways for implementing process communication, but it takes multiple steps to establish message queues and shared memory among processes. Moreover, message queues and shared memory are very valuable system resources that must be consumed by such process communications. For simple applications, a process communication mechanism that has very little overhead and takes almost no initialization steps is needed.

The present invention of a method and system of process identification by User Defined Process Variables provides a simple, low-overhead, dynamic mechanism for solving these problems and limitations of operating system process service functions.

SUMMARY OF THE INVENTION

According to the present invention, a method and system is provided for attaching user defined information to a process object in a data processing system The method comprises creating a process control block corresponding to an invoked process. The control block has system defined process variables that are assigned values by the operating system. The method further comprises defining a user defined process variable in the process control block, and assigning a value to the user defined process variable.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3A is a table depicting the contents of a process control block and one example of a preferred embodiment of the present invention.

FIGS. 3B and 3C are tables depicting the contents of a process control block and examples of preferred embodiment of the present invention.

DETAILED DESCRIPTION OF THE PREFERRED EMBODIMENT

Figure 1:
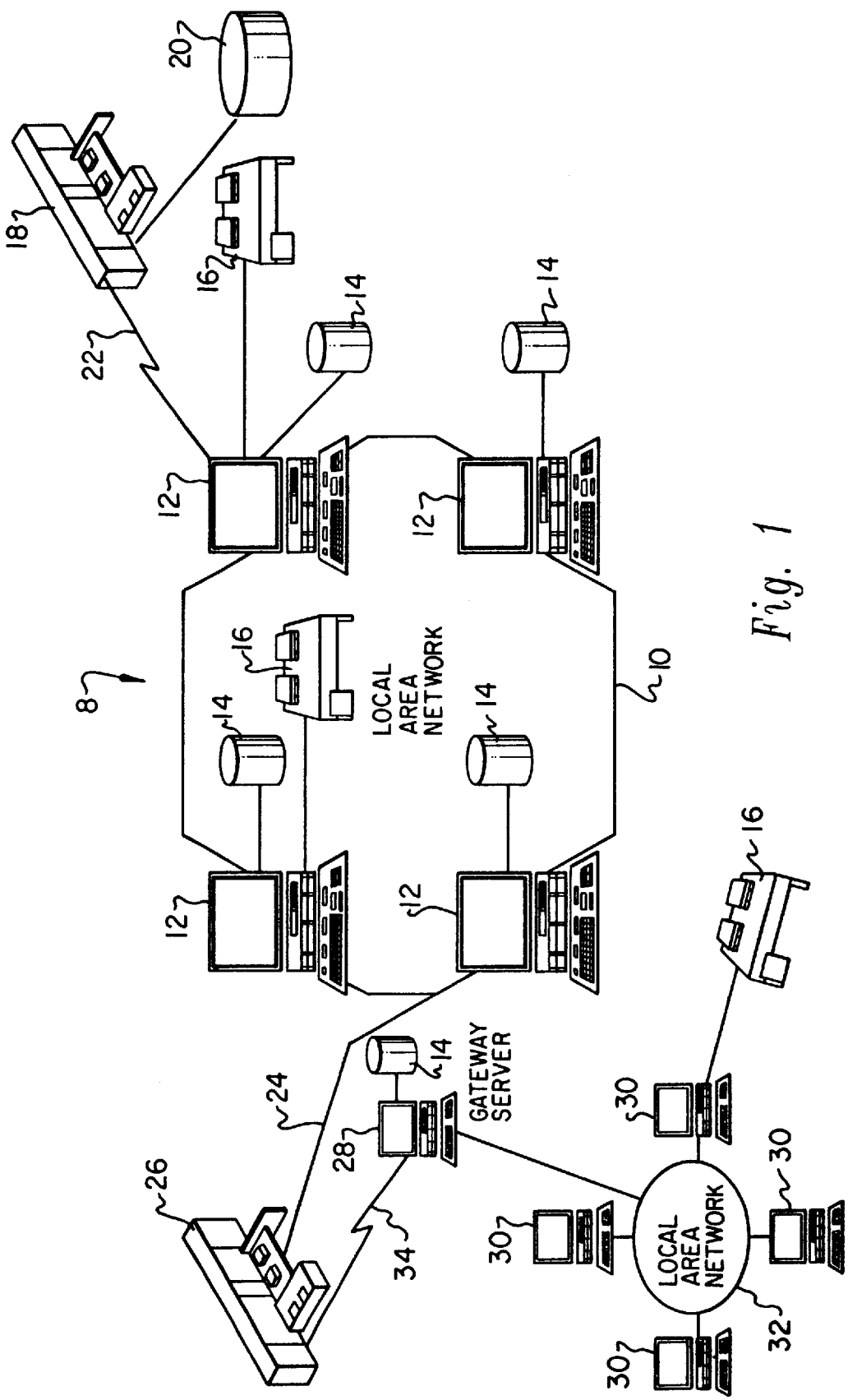
FIG. 1 depicts a distributed data processing system that may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or library Service for the data processing procedures and documents thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement an access control program. This is generally accomplished by listing those users authorized to access each individual data object or document, along with the level of authority that each user may enjoy with regard to a document within a Resource Manager or library Service. In this manner, the data processing procedures and documents may be accessed by enrolled users within distributed data processing system 8 and periodically "locked" to prevent access by other users.

Figure 2:
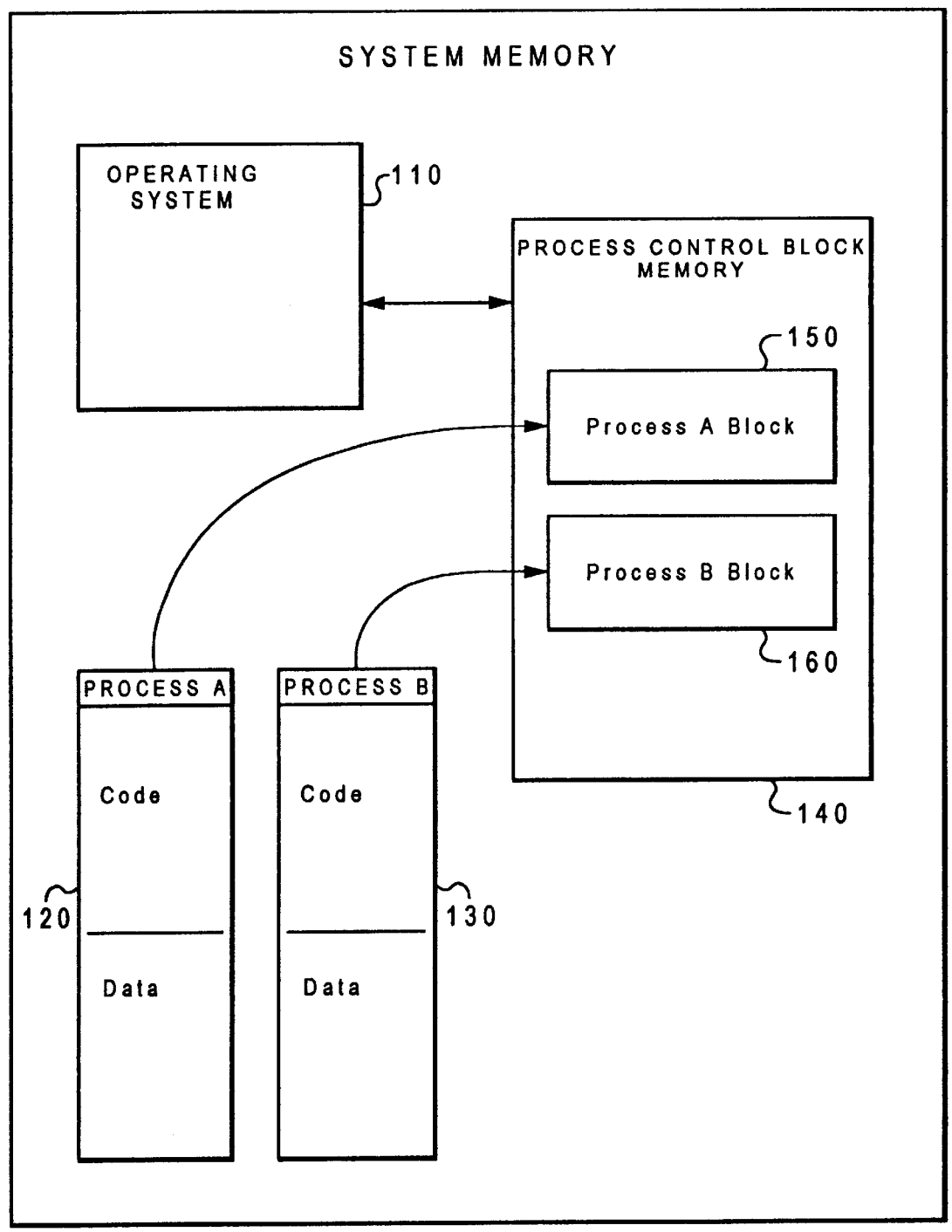
FIG. 2 is a block diagram depicting the contents of system memory in a preferred embodiment of the present invention.

Referring now to FIG. 2, there is depicted a block diagram representation of system memory 100, which may be residing in computers 12, 30 and/or storage devices 14, 20. In a preferred embodiment, each computer 12, 30 has a system memory 100. Within system memory 100 is operating system 110, which includes a variety of operating system process service functions. Also included in system memory 100 is the code and data for process 120 and the code and data for process 130.

A computer program, or process, performs a function for a data processing system. The process is performed by executing its code, which has previously been loaded into memory. A process is invoked by scheduling the process, identifying the location of its code, loading the code into memory if it is not already there, and passing control to the code for the process. When a process is invoked, prior to process code execution, the operating system will create a process control block that corresponds to that process. The operating system assigns the process control block a portion of memory, typically in kernel memory. The process control block contains data that is a record of its associated process and is used by the operating system, other processes, and users to manage and manipulate a particular process being executed in the system.

The types of information recorded in a process control block varies from operating system to operating system. However, each operating system records its own specific system defined process variables in the process control block Every process invoked in the system is assigned a process control block having the system defined process variables.

For example, in traditional UNIX® operating systems, the system defined process variables are predefined and are always the same. Examples of a display with information from multiple process control blocks, as typically found in UNIX® operating systems, is seen below in Table 1.

TABLE 1

| UID | PID | PPID | STIME | TTY | TIME | COMMAND |
| --- | --- | --- | --- | --- | --- | --- |
| smith | 1941 | 1 | 17:02:37 | console | 0:01 | sh |
| smith | 1990 | 1941 | 17:10:11 | console | 1:00 | startdbm |
| smith | 2001 | 1990 | 17:12:00 | console | 0:10 | db_agent |
| smith | 2005 | 1990 | 17:12:05 | console | 0:05 | db_agent |
| smith | 2007 | 1990 | 17:12:10 | console | 0:11 | db_agent |

As seen in Table 1, each process is assigned a user ID (UID) corresponding to the user originating the process. In this example, each of the five processes shown have a user ID of "smith". In the second column, each process invoked by the system is assigned a unique processor ID number (PID) that uniquely identifies that process. The Parent Process ID (PPID) indicates the process, by its process ID, which spawned that particular process. STIME indicates the start time of the process. The next three columns indicate the default display used by the process, the total processing time, and the initiating command for the process, respectively.

As can be seen from Table 1, the only unique identifier for any particular process is its PID. Unfortunately, processor IDs are created at run time, making it difficult for the owner process (the process which corresponds to the process control block) and other processes to interact with the process control block and the owner process, and to manage their performance. This becomes particularly difficult in the case of operating system process service functions, such as process monitor, process management, process synchronization, and process communication, as explained herein above.

Referring again to FIG. 2, when a process is invoked, in accordance with the present invention, operating system 110 creates a process control block in a process control memory location 140. For example, when process 120 is invoked, operating system 110 will create process control block 150.

Likewise, operating system 110 will create process control block 160 when process 130 is invoked.

Process control block 150 contains nine fields 161–169, as seen in FIG. 3A. For every process invoked, certain fields have been predefined to be specific system defined process variables, as is known in the art. For example, process control block 150 is automatically created with system defined process variables UID, PID, PPID, STIME, TTY, TIME, and COMMAND, which are entered in fields 161, 162, 163, 166, 167, 168, and 169, respectively. In addition, operating system 110 has assigned values to the system defined process variables (located below the corresponding variable as seen in control block 150), which are representative of owner process 120.

According to a preferred embodiment of the present invention, two additional fields are included in the process control block that have not been defined with any process variables or corresponding assigned values. While fields 161–163 and 166–169 contain system defined process variables, the user definable fields 164 and 165 are never defined or assigned values by the operating system. When a user definable field is defined, it becomes a User Defined Process Variable. Although the preferred embodiment is described as having only these two user defined fields, it should be understood that the present invention may be practiced by providing any number of user definable process control block fields, for example, through a linked list of fields.

When process 120 begins to execute, it will immediately access its corresponding process control block 150 to define and assign values for its User Defined Process Variables. Referring to FIG. 3B, it can be seen that process 120 has defined the process variable for field 164 to be "PROC_NAME", and has defined the process variable for field 165 to be "GROUP_NAME". Thus, as shown in the example of FIG. 3B, the User Defined Process Variable 164 has been defined by process 120 to be a "PROC_NAME" type variable. Further, "PROC_NAME" has been assigned a value of "shell-1" in field 164. The User Defined Process Variable "GROUP_NAME" has been assigned a value of "sys" in field 165.

A User Defined Process Variable is defined by giving the variable a process variable name consisting of ASCII text, chosen by the application developer, that is used to identify a particular variable. The process also assigns a value to the User Defined Process Variable in the same field. The process variable value consists of any form of data.

In a preferred embodiment, the process variables can only be created and written by the process control block's owner process, which is the process which the control block corresponds. However, it can be read by other processes.

These process variables may either be hard-coded into the code of the process, or determined at run time based on input received directly from the user, either with or without being prompted to do so by the owner process. In other words, each User Defined Process Variable is not an environment variable to the operating system Instead, it is a variable that belongs to each process. A User Defined Process Variable is a process resource and a system defined process variable is a system wide resource.

As an alternative example, consider process control block 160 in FIG. 3C. Here, process 130 has defined two User Defined Process Variables. A User Defined Process Variable named "READY" has been assigned a value of "False" in field 170. Process 130 has defined the User Defined Process Variable as "GROUP_NAME" in field 171, just as was done by process 120, and assigned the "GROUP_NAME" process variable a value of "dbm", which indicates that both process 130 and 120 belong to the same group.

In an alternative preferred embodiment of the present invention, a second process defines and assigns the User Defined Process Variable in the process control block for an owner process. For example, this parent process may have spawned the child process, which is the owner process of the process variable. After the operating system has created a process control block corresponding to the child process, including defining and assigning values for the system defined process variables, the parent process is allowed to define and assign values for the User Defined Process Variables, which are then entered in the control block by the owner process. This allows the parent process to define and set process variables before the child process begins execution. In essence, the parent process becomes the user, with respect to the owner process. It should be understood that, although not desirable from a system management point of view, a parent process could be allowed to enter the variables into the control block directly, without assistance or permission from the owner process.

As can be seen, the User Defined Process Variables enhance system management by acting as process attributes which may be referenced by the operating system. User Defined Process Variables are managed by the operating system and stored in the kernel memory of the computer system after the owner process has defined and assigned a value for each of the User Defined Process Variables.

Following are examples of how the User Defined Process Variables of the present invention may be used to enhance and improve the operation of the operating system and the performance of various processes in a data processing system:

Process Monitor

Assuming that each process has defined and assigned values to the process variables "PROC_NAME" and "GROUP NAME", the process status of the operating system can be displayed as shown in Table 2:

TABLE 2

| UID | PID | PPID | PROC_NAME | GROUP_NAME | STIME | TTY | TIME | COMMAND |
|---|---|---|---|---|---|---|---|---|
| smith | 1941 | 1 | shell-1 | sys | 17:02:37 | console | 0:01 | sh |
| smith | 1990 | 1941 | dbm-mon | dbm | 17:10:11 | console | 1:00 | startdbm |
| smith | 2001 | 1990 | agent-1 | dbm | 17:12:00 | console | 0:10 | db_agent |
| smith | 2005 | 1990 | agent-2 | dbm | 17:12:05 | console | 0:05 | db_agent |
| smith | 2007 | 1990 | agent-3 | dbm | 17:12:10 | console | 0:11 | db_agent |

As seen in Table 2, each process has a unique user defined "PROC_NAME" value, even though each has the same user ID. This example assumes that the "db_agent" process has the capability of generating unique values for the "PROC_NAME" defined variable. This could be done by querying a user for a value, or otherwise generating a unique name as is known in the art. If the "PROC_NAME" were simply hard coded into the "db_agent" process, the "PROC_NAME" for each of processes 2001, 2005, and 2007 would be identical. For example, the command for showing the status of processes in the system can be modified to complement the present invention by displaying the process status of a particular process by specifying that processes' "PROC_NAME" value. For example, command: monproc uid=smith PROC_NAME=agent-1
the resulting output that will be displayed on a user's terminal as a result of this command will be:
process status:

| UID | PID | PPID | PROC_<br>NAME | GROUP_<br>NAME | STIME | TTY | TIME | COMMAND |
|---|---|---|---|---|---|---|---|---|
| smith | 2001 | 1990 | agent-1 | dbm | 17:12:00 | console | 0:10 | db_agent |

As another example, the process status of a group of processes can be displayed by referencing the application group (GROUP_NAME) value in the following "monproc" command.

command: monproc uid=smith GROUP_NAME=dbm

This command will display all processes that have process attributes as defined in the "monproc" command line. So, specifically, each process having a user ID equal to "smith" and a "GROUP_NAME" equal to "dbm" will be displayed to the user as follows:
process status:

| UID | PID | PPID | PROC_<br>NAME | GROUP_<br>NAME | STIME | TTY | TIME | COMMAND |
|---|---|---|---|---|---|---|---|---|
| smith | 1990 | 1941 | dbm-mon | dbm | 17:10:11 | console | 1:00 | startdbm |
| smith | 2001 | 1990 | agent-1 | dbm | 17:12:00 | console | 0:10 | db_agent |
| smith | 2005 | 1990 | agent-2 | dbm | 17:12:05 | console | 0:05 | db_agent |
| smith | 2007 | 1990 | agent-3 | dbm | 17:12:10 | console | 0:11 | db_agent |

Modification of known process monitor applications or the creation of new applications to access the User Defined Process Variables in the process control block can easily be accomplished by those skilled in the art, and therefore, is not described in detail herein.

Process Management

By introducing a group process attribute, for example, by introducing a "GROUP_NAME" User Defined Process Variable, process management applications are much easier developed. For example, a group of application processes can be killed with one command or a single operating system service call. Without this process group concept, each process has to be identified individually by searching its process ID in the process status display. Then, each would be killed one by one. As can seen in the following example, the present invention substantially simplifies process management features, such as process termination.

As an example, if a process named "killproc" is used as a process management tool to terminate processes currently executing in the system, a command to execute would specify attributes that identify processes to be terminated. For example, command: killproc uid=smith GROUP_NAME=dbm
would execute "killproc", and kill all processes having a user ID equal to "smith" and that belong to the group "dbm".

Another application of the "GROUP_NAME" process variable in process management is when a signal is to be broadcast to a group of processes. The present invention allows the signal to be broadcast to a group of processes using a single command, rather than having to broadcast individually to each process. For example, command: sigproc USERSIG1 uid=smith GROUP_
NAME=dbm
would execute a process named "sigproc" which would transmit a user defined signal "USERSIG1" to every process in the "dbm" group.

Process Synchronization

The User Defined Process Variables can be used as indicators to coordinate process activities. For example, the monitor process can define a process variable named "READY" and the other agent processes that are managed by the monitor process will wait until the value of the "READY" process variable reaches a "TRUE" state.

For example, assuming that the process ID of the monitor process is "1992", the command, command: waitproc pid=1992 Ready=TRUE
would execute a process named "waitproc" that would not allow the spawning process to continue executing until "ready" equals true in the monitor process. In this example, the monitor process has defined a User Defined Process Variable of "Ready", and first assigns this variable a value of "FALSE". Then, after some predetermined event, the monitor process will assign the "Ready" process variable a value of "TRUE". At that time, the spawning process will resume execution.

Process Communication

The User Defined Process Variables can be used to communicate information among processes. For example, one process, which has a process ID of 1992, can define a User Defined Process Variable named "COUNT" and the other processes can read the value of "COUNT" as that value is assigned by the owner process.

The above examples can be implemented with system programming interfaces (SPI) so that they can be called from computer programs. For single user operating systems, such as OS/2®, "UID" can be omitted in the above examples.

An Application Programming Interface (API) is provided by the operating system to allow processes and users to utilize the User Defined Process Variables of the present invention. In a preferred embodiment of the present invention, the API is defined with C Programming Syntax, as is shown below, but it will be appreciated by those skilled in the art that the API can be programmed in the programmer's preferred programming language. The following four functions are provided by the API according to a preferred embodiment of the present invention:

1) Create Process Variables int Create_Proc Var(char * proc_var_name)

where proc_var_name: the process variable name

Figure 4:
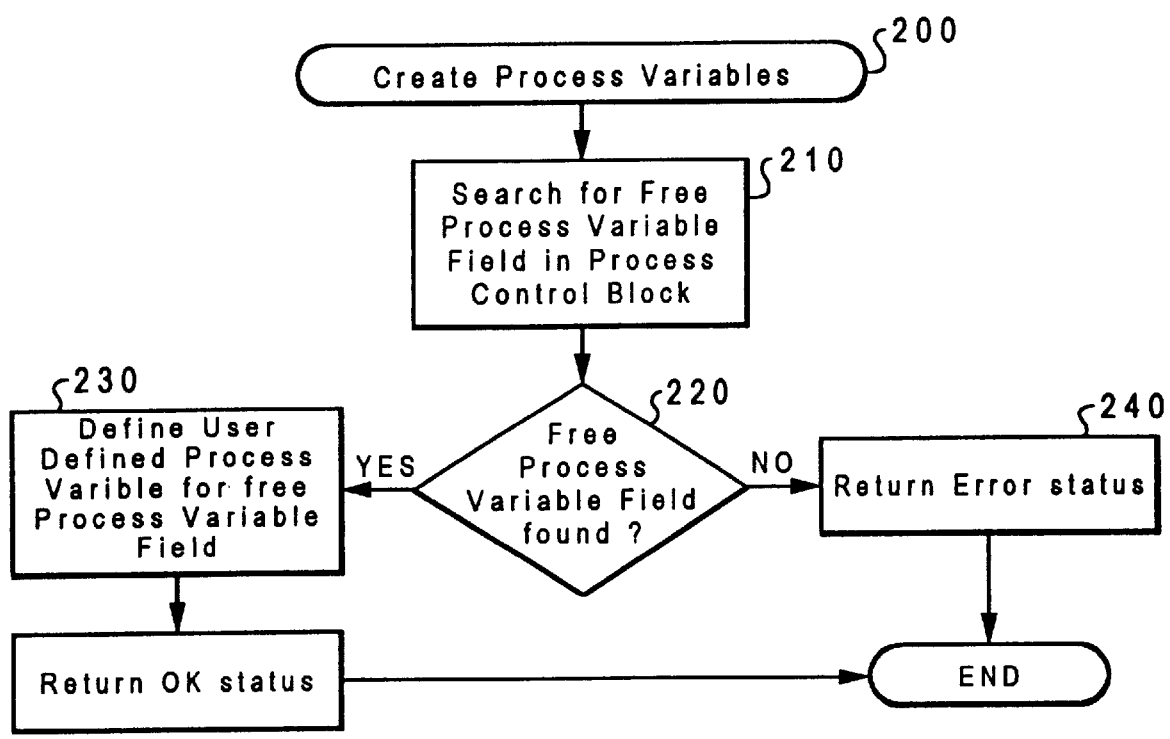
FIG. 4 is a flow diagram of the Create Process Variables Application Programming Interface.

Only the owner process of the process variables can create process variables. Referring to FIG. 4, there is shown a flow diagram of the Create Process Variables API. The process begins at step 200, and proceeds to step 210, where the process control block is searched for a "free" or "empty" process variable field. If a free process variable field is found at step 220, the process proceeds to step 230, where the user or user process is allowed to define a user defined processor variable for the free process variable field found at step 220. If the field is successfully defined, a "return ok" is returned to the owner process, and the API ends. If no free process variable field is found at decision block 220, a "Return Error" is returned to the owner process at step 240, and the API ends.

Figure 5:
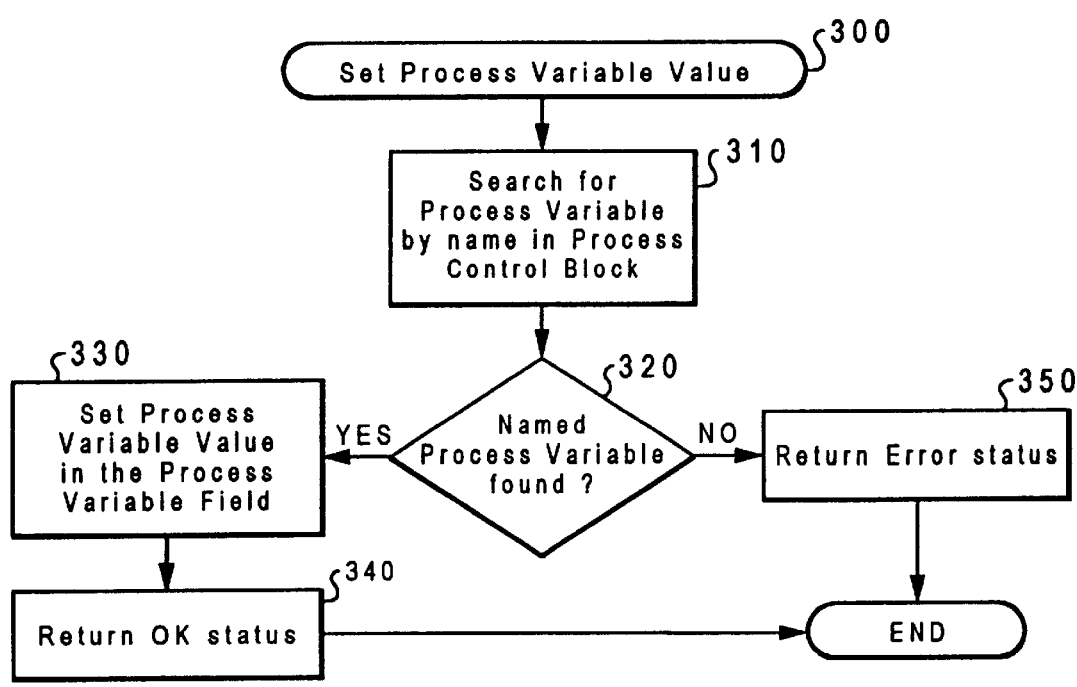
FIG. 5 is a flow diagram of the Set Process Variable Value Application Programming Interface.

2) Set Process Variable Values int Set_Proc_Var_Value(char * proc_var_name, char * proc_var_value)

where proc_var_name: the process variable name proc_var_value: the process variable value Only the owner process of the process variables can set the values of their process variables. Referring to FIG. 5, there is shown a flow diagram of the API for setting, or assigning, process variable values. The process starts at step 300 and proceeds to step 310, where the process control block is searched for a particular defined process variable which matches "proc_var_name". If the process variable is found at decision block 320, the process proceeds to step 330, where the process variable "proc_var_value" is assigned to the process variable field found. At step 340 a "Return OK" status is returned to the owner process, and the API ends. If a field is not found at decision block 320, a "Return Error" is returned to the owner process, as shown at step 350, and the API ends.

3) Read Process Variable Values int Read_proc_Var_Value(int proc_id, char* proc_var_name, char * proc_var_value)

where proc_id: the process ID. (note that if this API is called by the owner process variable, set proc_id=0)

proc_var_name: the process variable name.

proc_var_value: the return process variable value.

Figure 6:
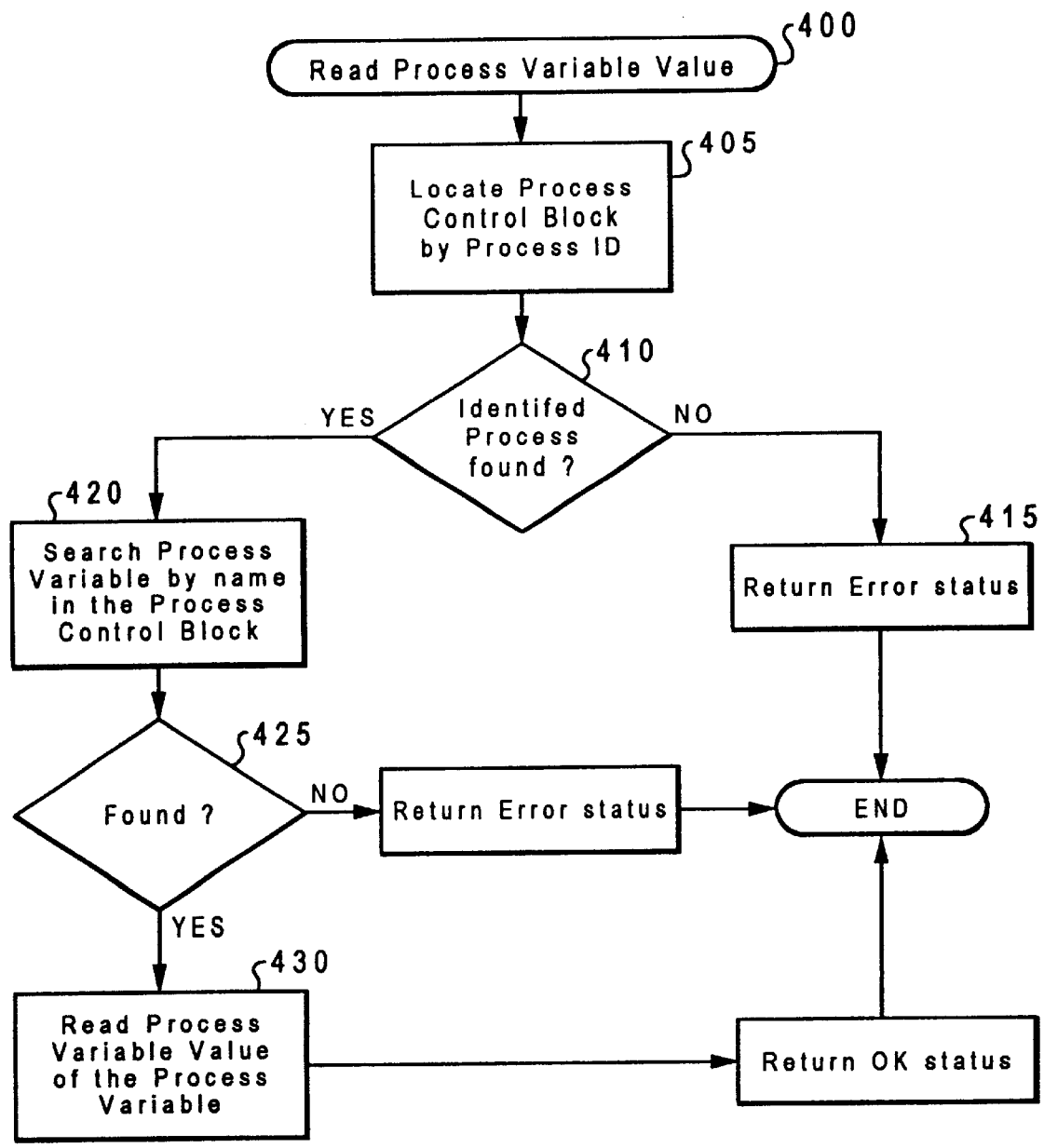
FIG. 6 is a flow diagram of the Read Process Variable Value Application Programming Interface.

Any process can read the process variable values of the other processes. Referring to FIG. 6, there is shown a flow diagram of the Read Process Variable Value API. The process begins at step 400 and proceeds to step 405, where a process control block is located by its processor ID. It, at decision block 410, no process ID is found having the requested process ID, a "Return Error" status message is returned to the owner process at step 415, and the API ends. If the process ID is located, a search is made of the process control block for a process variable having the name indicated by "proc_var_name", as shown at step 420. If the process variable is found, at step 425, the process variable value of that process variable is read, at step 430. Then, a "Return OK" status message is sent to the owner process, and the API ends. If no process variable is found at decision block 425, a "Return Error" is returned to the owner process, and the API ends.

4) Find Process Identification by Process Variables typedef struct proc_var_array( char * proc_var_name; char * Proc_var_value; ) proc_var_def;

int Find_Proc_ID_By_Proc_Var(int proc_var_num, proc_var_def proc_var_array[], int * proc_num, int * proc_id_array[])

where proc_var_num: the number of process variables in the process variable array, proc_var_array.

proc_num: the number of process IDs in the process ID array, proc_id array.

proc_id_array: the process ID array returned in the process ID array, proc_id_array.

proc_var_array: array of the process variable definition including name and value.

Figure 7:
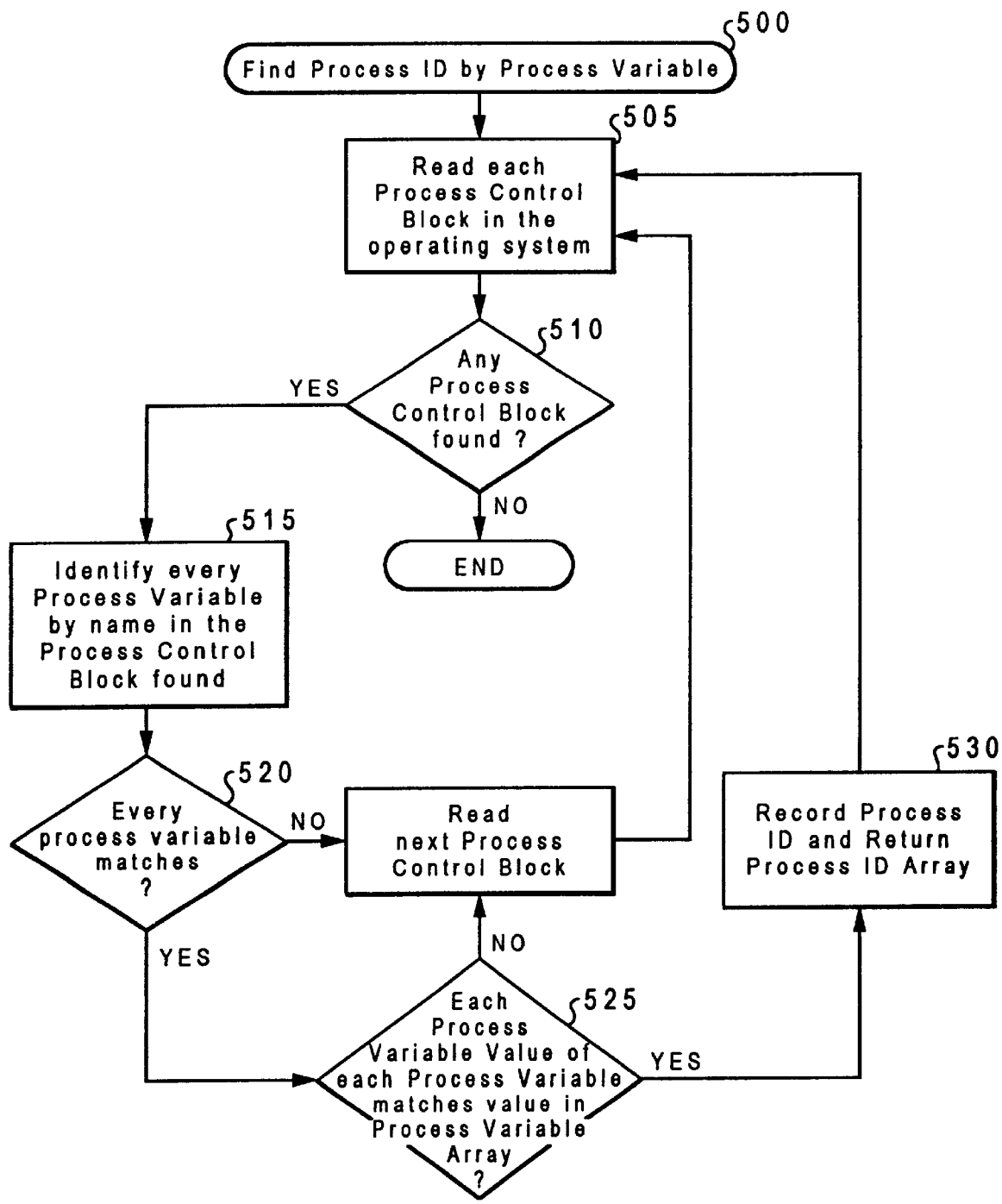
FIG. 7 is a flow diagram of the Find Process ID by Process Variable Application Programming Interface.

The input process variable values are specified by the proc_var_array variable. The process IDs of those processes that have process variable values that match the input process variable values are returned in the proc_id_array variable. Any process can call this API. Referring to FIG. 7, a flow diagram of the Find Process Identification by Process Variables API is shown. The process begins at step 500 and proceeds to step 505, where each process control block in the operating system is read. If no control block is found, at step 510, the API ends. If a process control block is found, each process variable name is identified at step 515. If every process variable name matches the "proc_var_array", at step 520, the process proceeds to step 525. If the process variable name is not found, the process returns to step 505. At step 525, each process variable found has its value checked against "proc_var_value", as defined in "proc_var_array". If no value is matched, the process returns to step 505. If each value is matched, the process ID for the owner process of the process control block is recorded and returned to the initiator of the API in the "process ID array", at step 530. The process then returns to step 505.

The computer programming required to create the operating system process service functions used as examples for implementing the present invention are well within the capability of those skilled in the art. In addition, the procedures for implementing the Application Programming Interface is simply accomplished by computer programming as will be appreciated by those skilled in the art. Although the API and examples were described using C Programming Syntax, it should be understood that analogous programming languages could be used to implement the present invention, and that analogous command lines and definitions could be used, as will be appreciated by those skilled in the art.

In summary, the present invention provides an improvement to operating system processor functions by providing a User Defined Process Variable mechanism, whereby an application can attach information to a process object. User Defined Process Variables can be retrieved by the operating system and by other application programs, and can be applied in many process services, including process monitor, process management, process synchronization, and process communication. User Defined Process Variables are very easy to use for multiple process management services, they have a low overhead in the base operating system, and they provide flexibility to application developers that has been previously unavailable.

While the invention has been particularly shown and described with reference to a preferred embodiment, it will be understood by those skilled in the art that various changes in form and detail may be made therein without departing from the spirit and scope of the invention.

What is claimed is:

1. A method for attaching user defined information to a process object in a data processing system, the method comprising the steps of:

invoking a first process;

creating a control block corresponding to the first process, wherein the control block has system defined process variables that are assigned values by the operating system;

searching for an undefined process variable field in the process control block for the first process, after the first process has been invoked;

if an undefined process variable field is found, defining a User Defined Process Variable in the undefined process variable field; and assigning a value to a User Defined Process Variable in the control block corresponding to the first process.

2. A method according to claim 1, wherein the User Defined Process Variable defined in the control block corresponding to the first process can only be defined and assigned a value by the first process.

3. A method according to claim 1, wherein a second process spawns the first process, and wherein the second process defines the User Defined Process Variable in the control block corresponding to the first process.

4. A method according to claim 1, said method further comprising the step of receiving inputs defining the User Defined Process Variable from a user terminal.

5. A method according to claim 1, said method further comprising the step of receiving inputs assigning the value to the User Defined Process Variable from a user terminal.

6. A method according to claim 1, wherein:

said defining step includes the step of defining said User Defined Process Variable as a process identifier variable; and said assigning step includes the step of assigning said first process a process identifier.

7. A method according to claim 1, wherein:

said defining step includes the step of defining said User Defined Process Variable as a process synchronization variable; and said assigning step includes the step of assigning said first process a selected value in response to a predetermined event.

8. A method according to claim 1, said method further comprising the step of reading said value of said User Defined Process Variable in said control block corresponding to said first process from a second process.

9. A method according to claim 2, wherein the User Defined Process Variable is defined by the first process in response to input from a user at run-time of the first process.

10. A method according to claim 2, wherein the User Defined Process Variable is defined by using a data array pre-coded in the first process.

11. A method according to claim 2, wherein the value of the User Defined Process Variable is input by the first process in response to input from a user at run-time of the first process.

12. A method according to claim 2, wherein the value of the User Defined Process Variable is pre-coded in the first process.

13. A method according to claim 3, wherein the second process assigns the value of the User Defined Process Variable for the control block of the first process.

14. A data processing system for attaching user defined information to a process object, the data processing system comprising:

means for invoking a first process;

means for creating a control block corresponding to the first process, wherein the control block has system defined process variables that are assigned values by the operating system;

means for searching for an undefined process variable field in the process control block for the first process, after the first process has been invoked;

means, responsive to locating an undefined process variable field in the process control block corresponding to the first process, for defining a User Defined Process Variable in the undefined process variable field; and means for assigning a value to a User Defined Process Variable in the control block corresponding to the first process.

15. A data processing system according to claim 14, the User Defined Process Variable being defined and assigned a value by only the first process.

16. A data processing system according to claim 14, wherein a second process spawns the first process, and wherein the second process defines the User Defined Process Variable in the control block corresponding to the first process.

17. A data processing system according to claim 14, wherein inputs defining the User Defined Process Variable are received from a user terminal.

18. A data processing system according to claim 14, wherein inputs assigning the value to the User Defined Process Variable are received from a user terminal.

19. A data processing system according to claim 14, wherein:

said means for defining comprises means for defining said User Defined Process Variable as a process identifier variable; and said means for assigning comprises means for assigning said first process a process identifier.

20. A data processing system according to claim 14, wherein:

said means for defining comprises means for defining said User Defined Process Variable as a process synchronization variable; and said means for assigning comprises means for assigning said first process a selected value in response to a predetermined event.

21. A data processing system according to claim 14, and further comprising means for reading said value of said User Defined Process Variable in said control block corresponding to said first process from a second process.

22. A data processing system according to claim 15, wherein the User Defined Process Variable is defined by the first process in response to input from the user at run-time of the first process.

23. A data processing system according to claim 15, wherein the User Defined Process Variable is defined using a data array pre-coded in the first process.

24. A data processing system according to claim 15, wherein the value of the User Defined Process Variable is assigned by the first process in response to input from a user at run-time of the first process.

25. A data processing system according to claim 15, wherein the value of the User Defined Process Variable is pre-coded in the first process.

26. A data processing system according to claim 16, wherein the second process assigns the value of the User Defined Process Variable for the control block of the first process.

* * * * *